United States Patent [19]

Rushmere

[11] Patent Number: 4,954,220

[45] Date of Patent: Sep. 4, 1990

[54] POLYSILICATE MICROGELS AS RETENTION/DRAINAGE AIDS IN PAPERMAKING

[75] Inventor: John D. Rushmere, Wilmington, Del.

[73] Assignee: E. I. Du Pont de Nemours and Company, Wilmington, Del.

[21] Appl. No.: 388,967

[22] Filed: Aug. 7, 1989

[51] Int. Cl.⁵ ............................................. D21H 21/10
[52] U.S. Cl. ................... 162/168.3; 162/175; 162/178; 162/181.6; 162/183
[58] Field of Search ..................... 162/181.6, 175, 178, 162/168.3, 183

[56] References Cited

U.S. PATENT DOCUMENTS 4,750,974  6/1988  Johnson .............................. 162/181.6
4,795,531  1/1989  Sofia et al. ........................ 162/181.6

Primary Examiner—Peter Chin

[57] ABSTRACT

The use of anionic polysilicate microgels with an organic polymer to flocculate pulp and filler fines, such that water removal is easier and fines retention is greater.

7 Claims, No Drawings

POLYSILICATE MICROGELS AS RETENTION/DRAINAGE AIDS IN PAPERMAKING

FIELD OF INVENTION

This invention relates to papermaking, particularly to a method whereby a suspension of pulp and inorganic filler in water is spread over a wire or net and the water is removed to form a fiber web or sheet. More particularly, the invention relates to the addition of anionic polysilicate microgels together with an organic polymer to flocculate the pulp and filler fines, such that, during the water removal step, water removal is easier and fines retention is greater, thereby increasing both the productivity and yield of the papermaking process.

BACKGROUND AND SUMMARY OF INVENTION

Many additive systems for improving wet-end drainage and fines retention have been disclosed in the prior art. The systems include employing polymers, combinations of polymers and polymers combined with colloidal silica. The latter systems are among the most efficient now in use, but there is a continuing need to provide additives with reduced cost and improved performance.

This invention employs, as a retention and drainage aid, polysilicate microgels formed by the partial gelation of an alkali metal silicate or a polysilicate such as sodium polysilicate, having in its most common form one part $Na_2O$ to 3.3 parts $SiO_2$ by weight. The microgels, which are referred to as "active" silica in contrast to commercial colloidal silica, consist of aggregates of very small, e.g., 1 nm, particles arranged into three dimensional networks and chains. They typically have a very high surface area, usually greater than 1000 square meters per gram ($m^2/g$) and are used in the papermaking process in conjunction with cationic polymers derived from natural or synthetic sources.

Polysilicate microgels can be formed most readily by the addition of an initiator to a solution of sodium polysilicate. The initiator starts the process of gelation which, if allowed to proceed to completion, would result in the total solidification of the solution. The gel solidification time, that is the length of time for total solidification to occur once initiated, the can range from seconds to months and depends on a variety of factors including pH, silica concentration, temperature and the presence of neutral salts. For commercial applications, short gel solidification times are preferred. Once initiated, gelation is allowed to proceed for about 5% to 95% of the gel solidification time before being stopped by diluting the polysilicate solution, preferably to about 1 weight percent (wt%) $SiO_2$ or less.

The solution of polysilicate microgels so formed has been found to constitute an excellent retention and drainage aid when combined with a water soluble cationic polymer, preferably cationic starch, cationic guar or cationic polyacrylamide.

Prior Art

U.S. Pat. No. 2,217,466 describes the early use of polysilicic acid or active silica as a coagulant aid in the treatment of raw water. The article "Activated Silica, a New Engineering Tool" by Merrill and Bolton, Chem. Eng. Progress 1, [1947], 27 suggests the use of active silica as a coagulant for paper mill white water and as a retention aid for fiber and filler fines when added to the head box of a paper machine. No mention is made of the co-use of anionic active silica together with cationic polymers.

U.S. Pat. Nos. 3,224,927 and 3,253,978 disclose the co-use of colloidal silica and cationic starch as a binding agent for inorganic fibers in refractory fiber bonding applications. The quantities of colloidal silica used are considerably larger than in papermaking applications, that is 10-20 wt% of the product for fiber bonding applications versus about 1 wt% for papermaking applications. In fiber bonding, conditions leading to flocculation are to be avoided, whereas, in papermaking, flocculation is a desired result of the additions.

U.S. Pat. No. 4,388,150 discloses a binder composition comprising colloidal silica and cationic starch for addition to papermaking stock to improve retention of stock components or for addition to white water to reduce pollution problems and to recover stock component values. U.S. Pat. No. 4,388,150 teaches that the colloidal silica may take various forms including that of polysilicic acid but that best results are obtained through the use of silica in colloidal form. The patent teaches that polysilicic acid itself is undesirable and without stabilization deteriorates on storage.

It has now been found that some storage or aging of polysilicic acid is desirable. Complete gelation of aqueous solutions of polysilicic acid is to be avoided since once gelled the solutions have little benefit for use as a retention and drainage aid. Storage or aging of polysilicic acid leads to the formation of silica microgels which, when combined with various cationic polymers, provide retention and drainage aid systems which are at least the equivalent and, in many cases, superior of those provided by the colloidal silica/cationic starch combinations of the prior art.

DETAILED DESCRIPTION OF THE INVENTION

In his book "The Chemistry of Silica" published by John Wiley & Sons, N.Y., 1979, R. K. Iler describes on pages 174-176 and pages 225-234 the polymerization of polysilicic acid and the formation of microgels comprised of three-dimensional aggregates of very small particles of polysilicic acid. Such microgels have also been termed "active silica" and are distinct from the parent uncrosslinked polysilicic acid and from colloidal silica or colloidal silicic acid solutions commonly encountered in commerce. Microgels in a sol cannot be readily detected by techniques normally used to detect colloids in a sol, as for example by light scattering. Likewise, microgels cannot be readily separated from the sol by centrifuging. According to R. K. Iler, in the above cited text on page 231, the concentration of silica particles in the three-dimensional network of the microgel, the refractive index of the microgel and the density of the microgel are the same as in the surrounding sol.

Further methods for the production of active silica and its use in water purification are discussed in the book "Soluble Silicates" Vol.II, by James G. Vail, published by Reinhold Publishing Co., N.Y., 1960. This source and a general reading of published literature suggests that polysilicate microgels may be produced as follows:

(1). Aqueous solutions of alkali metal silicates may be acidified by acid exchange resins and inorganic and organic acids such as sulfuric and acetic acids. After acidification of the silicate to a pH of about 2–10.5, some storage or aging of the solution is usually required to permit the formation of the polysilicic acid microgels. The aging time depends primarily on the pH and the concentration of silica. After the aging period, which may be very brief (a few minutes or so) for a solution containing 4–5 wt% silica at a pH of 3–4, the solution is diluted to about 1 wt% silica or less in order to stabilize it by retarding further growth of the microgels.

(2). Aqueous solutions of alkali metal silicates may be acidified by acid salts and gases such as sodium orthoborate (borax), sodium bisulfite, potassium dichromate, sodium bicarbonate, sodium dihydrogen phosphate, carbon dioxide, sulfur dioxide and chlorine. Acid salts of weak bases and strong acids such as ammonium sulfate, aluminum sulfate, ferric and ferrous chlorides and the like may also be used.

(3). Alkali metal salts of amphoteric metal acids may be added to aqueous solutions of alkali metal silicates. Examples of such salts are sodium aluminate, sodium stannate, sodium zincate, potassium chromate and potassium vanadate. These salts do not reduce the alkalinity of the silicate solutions but nevertheless initiate the process of gelation and the formation of silica microgels.

(4). Certain organic compounds may be added to aqueous solutions of alkali metal silicates. The organic compounds should be preferably, but not necessarily, soluble in water and capable of effecting at least a partial acidification of the silicate solution, usually as the result of the hydrolysis of the organic compound. Examples of such compounds are organic anhydrides, amides, esters, lactones, nitriles and sultones. More specifically, for example, they are succinic anhydride, acetamide, ethyl acetate, butyrolactone, propionitrile and propane sultone respectively. In the case of the more stable organic compounds some warming of the mixture may be required to effect hydrolysis and resultant polysilicate microgel formation.

All of the above methods are, in principle, applicable to the formation of polysilicate microgels useful in papermaking. A large number of them, however, have little commercial consequence when cost, safety and environmental standards are considered. For example, vanadium salts are costly and it is best to avoid the use of hazardous chlorine. Similarly the discharge of toxic chromium salts into papermill white water is undesirable.

From a commercial standpoint, the simplest and most economic methods for the preparation of the polysilicate microgels used according to this invention are the acidification of sodium polysilicate solution with a common mineral acid or the addition of a gel initiator such as alum, sodium borate or sodium aluminate to a sodium polysilicate solution.

In practicing the invention, it is best to employ commercially available solutions of sodium polysilicate containing a ratio of 1 $Na_2O$:3.3 $SiO_2$, by weight. These are commonly supplied containing silica concentrations of 28–30 wt%. For the preparation of the polysilicate microgels, such commercial solutions generally must be first diluted to a concentration suitable for both the particular method of preparation chosen to initiate microgel formation and the concentration of initiator employed. For example, for microgel formation by acidification with a mineral acid, silica concentrations of about 0.1–6 wt% have been found to be most useful although R. K. Iler, on page 288 of the above cited text, teaches that solutions of sodium polysilicate containing up to 12 wt% $SiO_2$ can be successfully acidified using sulfuric acid. If, however, a non-acidic material such as sodium borate is to be used as the initiator, any concentration of silicate can be employed provided the gel solidification time of the mix is sufficiently long to allow for dilution and stabilization of the polysilicate microgel before complete gel solidification occurs. Stabilization of the polysilicate microgels can be obtained by dilution, preferably to about 1 wt% $SiO_2$ or less.

It is important to stress that in the preparation of the polysilicate microgels, sufficient time be allowed for the formation of particle chains and three-dimensional networks before the gel is stabilized by dilution. This time, which will vary with the particular mode of operation, should be about 5–95%, preferably 10–90%, of the time at which a rigid water-insoluble mass forms (gel solidification time). An increased viscosity of the polysilicate solution itself is not particularly limiting provided a homogenous aqueous solution can be obtained on subsequent dilution. In practice, the gel solidification time should be as short as possible. It is most convenient to mix the silicate solution and an initiator, which preferably is also a solution, and then to dilute the mixture in as short a holding time as is required for sufficient microgel formation.

The polysilicate microgels so produced have been found to be generally as active in retention/drainage applications as the colloidal silicas now employed in similar commercial applications. In many instances, the polysilicate microgel combinations have been found to provide appreciably improved performance at lower loadings which is a desirable commercial objective. The polysilicate microgels may also offer cost advantages over commercial colloidal silicas since they may be easily manufactured at a paper mill site, thus minimizing product shipping costs.

In the papermaking process, the polysilicate microgels of the invention are used in conjunction with cationic polymers derived from natural or synthetic sources. The most useful of these polymers are cationic starches, cationic guars and cationic polyacrylamides, the application of which to papermaking have all been described in the prior art. Other cationic polymers may also be used in combination with the polysilicate microgels, either alone or in addition to the cationic starches, cationic guars and cationic polyacrylamides. Examples of such cationic polymers are polyethyleneimine, polydiallyldimethylammonium chloride, copolymers of acrylamide with 2-methylacryloxyethyltrimethyl ammonium chloride, amine-eipchlorohydrin condensation products and cationic wet strength resins obtained by condensing polyamines with dicarboxylic acids and then further reacting the prepolymer with epichlorohydrin. Cationic starches are particularly useful in that they have the advantages of low cost and of imparting dry strength to the paper. Where paper strength is not a primary requirement, use of the other polymers may be advantageous.

The cationic starch used may be derived from any of the common starch producing materials such as corn starch, potato starch, wheat starch and tapioca starch although the potato starches usually yield the most desirable cationized products for the practice of the invention. Cationization is effected by commercial manufacturers using reagents such as 3-chloro-2-hydroxypropyltrimethylammonium chloride to obtain cationic starches with degrees of nitrogen substitution varying between about 0.001 and 0.2 (i.e., about 0.01 to about 0.02%) by wt [wt% nitrogen/starch]). Any of these cationic starches may be used in combination with the polysilicate microgels of the invention. A cationic starch with a degree of nitrogen substitution of about 0.03 (i.e., 0.25 wt. percent) has most frequently been employed.

In use, the polysilicate microgels are employed in amounts ranging from about 0.001 to 1.? wt% [0.02 to 20 pounds per ton (lb/t)] of the dry weight of the paper furnish together with cationic polymer in amounts ranging from about 0.001 to 3.0 wt% (0.02 to 60 lb/t) of the dry weight of the paper furnish. Higher amounts of either component may be employed but usually without a beneficial effect and with the penalty of increased costs. Preferred addition rates are about 0.05 to 0.4 wt% (1 to 8 lb/t) for the polysilicate microgels together with about 0.5 to 1.0 wt% (10 to 20 lb/t) of cationic starch or, in the case of the cationic guars and cationic polyacrylamides, 0.001 to 1.0 wt% (0.02 to 20 lb/t).

The polysilicate microgel/polymer combinations may be used in paper furnishes over a wide pH range of about 4 to 10 although the more neutral and alkaline furnishes are preferred for best results. The paper furnish may be comprised of a variety of wood pulps and inorganic fillers. Thus, bleached Kraft pulp, thermomechanical, chemicalthermomechanical and groundwood pulps may all be used together with clays and precipitated or ground calcium carbonate and titanium dioxide as inorganic fillers. In the examples which follow, various methods for preparing and utilizing the polysilicate microgels of the invention are illustrated.

EXAMPLES

For the purpose of demonstrating the utility of the polysilicate microgels in papermaking, the primary measurement made has been that of drainage performance in the Canadian Standard Freeness Test. Measurements of the turbidity of the white water from the freeness test have provided an accompanying measure of the degree of retention of pulp and filler fines by the system. Measurement of fines retention in the Britt Dynamic Drainage Jar have also been made. In order to demonstrate utility compared to close prior art comparisons with a sample of a commercial colloidal silica identified as BMA-0 has been used. This product comprises one component of the retention/drainage aid system, Compozil, used in papermaking and marketed in the U.S. by Procomp, Inc., Marietta, Ga. The colloidal silica has a particle diameter of about 5.5 nanometers (nm) and a surface area of 500-550 m$^2$/g which is disclosed in U.S. Pat. No. 4,388,150 as being in an optimum range for a retention/drainage aid employing colloidal silica.

In each example, the same conditions of mixing and order of addition of components was maintained. The preferred method was found to be addition of the cationic polymer to the furnish first followed by the polysilicate microgel. This order was found to give generally superior performance to the reverse mode of addition, although the reverse mode (polysilicate microgel added first) may be employed, or addition of each material may be split as well. All mixing was done in a Britt Jar with the agitator set at 800 rpm and the following time sequence:

(1). Furnish was added to the Britt Jar and stirred for 15 seconds, (2). Cationic polymer was then added and stirred for 15 seconds, (3). Polysilicate microgel or colloidal silica then added and stirred for 15 seconds, and (4). The Britt Jar was then drained for fines retention measurements or its contents transferred to the holding cup of the Canadian Freeness Tester for drainage measurements.

EXAMPLE 1

This example compares the performance of a simple polysilicic acid with that of a polysilicic acid microgel. A comparison with the performance of the commercial colloidal silica, BMA-0, is also included.

The simple polysilicic acid used in this example was prepared by the rapid batch deionization of a sodium polysilicate solution (1 $Na_2O:3.3$ $SiO_2$) containing 1 wt% $SiO_2$ with an excess of Dowex ® 50W-X8[H+] polystyrene sulfonic acid resin. After the pH decreased to 3.5, the resin was filtered off and the solution diluted to 0.125 wt% $SiO_2$.

The polysilicic acid microgel used was prepared by the partial acidification and aging of a sodium polysilicate solution containing 4 wt% $SiO_2$. Thus, 19 ml. of 1.98 molar sulfuric acid was added over a period of 15 seconds to 300 g of the sodium polysilicate solution under good agitation. The pH of the solution decreased to 10.01. The solution was set aside and allowed to age for 1 hour after which it was stabilized by diluting it to 0.125 wt% $SiO_2$.

For the comparison tests, Canadian Standard Freeness measurements were made using an alkaline fine paper furnish of 0.3 wt% consistency. The suspended solids comprised 70 wt% bleached Kraft pulp (70% hardwood/30% softwood) and 30 wt% precipitated calcium carbonate. The pH was 8.0.

The tests of the various silica products were all made in combination with a cationic starch added to the furnish at a constant loading of 20 lb/t, dry weight of furnish basis. The cationic starch was BMB-S190, a potato starch with a degree of nitrogen substitution of about 0.03, sold by Procomp for use with its Compozil system. See Table 1 for results.

TABLE 1

| | DRAINAGE MEASUREMENTS | | |
|---|---|---|---|
| | Freeness, ml | | |
| lb/t $SiO_2$ loading | Colloidal Silica | simple polysilicic acid | Polysilicic acid Microgel |
| 1 | 420 | 395 | 430 |
| 2 | 440 | 395 | 480 |
| 4 | 485 | 400 | 530 |
| 8 | 530 | 400 | 520 |
| 10 | 500 | 400 | 510 |

It may be seen from Table 1 that the simple uncrosslinked polysilicic acid showed little activity in improving drainage of the furnish. The microgelled polysilicic acid, however, showed an overall activity at least as good as the commercial colloidal silica and even a somewhat enhanced activity at the commercially desirable low usages of 1 to 4 lb/t $SiO_2$.

EXAMPLE 2

This example demonstrates the use of papermakers' alum as an initiator for polysilicate microgel formation.

To 300 g of sodium polysilicate solution containing 4 wt%. $SiO_2$ and held under high agitation in a Waring blender was added, from a pipette, 75 milliliters (ml) of 10 wt%. alum [aluminum sulfate, $Al_2(SO_4)3.14H_2O$]. The mix was blended for 1 minute to yield a milky white solution having a pH 9.8 and containing a fine white precipitate. A portion was immediately diluted to 0.125 wt% $SiO_2$ [Microgel 2A]. A further portion was diluted to 0.125 wt% $SiO_2$ after standing for 20 minutes [Microgel 2B]. The remainder of the stock solution completely gelled after 30 minutes. The two dilute solutions of polysilicate microgel were examined for drainage performance in a similar manner to that described in Example 1. Results are listed in Table 2.

TABLE 2

| | DRAINAGE MEASUREMENTS | | |
|---|---|---|---|
| | Freeness ml | | |
| lb/t $SiO_2$ loading | Colloidal Silica | Polysilicate Microgel 2A | Polysilicate Microgel 2B |
| 2 | 440 | 450 | 420 |
| 4 | 485 | 520 | 490 |
| 8 | 530 | 530 | 560 |
| 10 | 500 | 485 | 540 |

The freeness values in Table 2 show that the drainage obtained with both microgels was at least as good as with the commercial sample of colloidal silica, particularly in a common usage range of 4–8 lb/t.

EXAMPLE 3

This example demonstrates the use of borax (sodium orthoborate decahydrate, $Na_2B_4O_7.10H_2O$) as an initiator for the formation of a polysilicate microgel.

To 60 g of 5 wt% borax solution under good agitation was added 40 g of sodium polysilicate solution containing 3.75 wt% $SiO_2$. After mixing, the mixture was set aside to age. After 8 minutes, a portion was diluted to 0.125 wt% $SiO_2$. The gel solidification time of the remaining undiluted portion was 23 minutes. Drainage measurements were made on the diluted microgel in an alkaline furnish similar to that of Example 1. The cationic starch used however was a sample of cationic potato starch, Stalok® 400, obtained from A. E. Staley Mfg. Co., Decatur, Ill. The starch loading was again 20 lb/t in all tests, the results of which are given in Table 3.

TABLE 3

| | DRAINAGE MEASUREMENTS | |
|---|---|---|
| | Freeness, ml | |
| lb/t $SiO_2$ loading | Colloidal Silica | Polysilicate Microgel |
| 1 | 415 | 450 |
| 2 | 435 | 490 |
| 4 | 470 | 545 |
| 8 | 545 | 530 |
| 10 | 530 | 465 |

At the commercially desirable low loadings of 1 to 4 lb/t $SiO_2$, the polysilicate microgel outperformed the colloidal silica sol. Optimum performance for the polysilicate microgel was at a loading of 4 lb/t versus 8 lb/t for colloidal silica.

EXAMPLE 4

This example illustrates two procedures using sodium stannate ($Na_2SnO_4$) as the initiator for the preparation of polysilicate microgels.

Microgel 4A: 50 g of a solution containing 5.2 wt% of sodium stannate was added over about 15 seconds with good stirring to 50 g of sodium polysilicate containing 5 wt% $SiO_2$. The mixture was set aside. After 4 hours, the mixture had become somewhat viscous and was then diluted to 0.125 wt% $SiO_2$ for evaluation as a drainage agent.

Microgel 4B: 46 g of a solution containing 10 wt% of sodium stannate was added over about 15 seconds with good stirring to 64 g of sodium polysilicate solution containing 5.5 wt% $SiO_2$. The mixture was set aside. After about 3.5 hours, it had set to a very loose gel. This loose gel was transferred to a Waring blender containing 350 g of water and blended at high speed for about 2 minutes to give a clear solution. The solution was then further diluted to 0.125 wt% $SiO_2$ for evaluation in drainage performance.

Canadian Standard Freeness measurements were made using both microgels at various loadings in an alkaline furnish similar to that used in Example 1. All tests were made using BMB S-190 cationic potato starch at a loading of 20 lb/t.

TABLE 4

| | DRAINAGE MASUREMENT | | |
|---|---|---|---|
| | Freeness, ml | | |
| lb/t $SiO_2$ loading | Colloidal Silica | Polysilicate Microgel 4A | Polysilicate Microgel 4B |
| 2 | 440 | 430 | 420 |
| 4 | 485 | 540 | 515 |
| 8 | 530 | 595 | 590 |
| 10 | 500 | 595 | 600 |

Both microgels may be seen to exhibit significantly enhanced drainage performance.

EXAMPLE 5

This example utilizes sodium aluminate ($NaAlO_2$) as the initiator in polysilicate microgel formation.

7.5 g of a sodium polysilicate solution containing 10 wt% $SiO_2$ was diluted to 30 g with water. To this was added slowly and with good stirring, 20 g of a sodium aluminate solution containing 1.0 wt% $Al_2O_3$. The sodium aluminate used was a dilution of a commercial liquid concentrate, VSA-45, obtained from Vinings Industries, Atlanta, Ga. The mixture was aged for 5 minutes without stirring and then sampled. The sample was diluted to 0.125 wt% $SiO_2$ for evaluation. The undiluted portion gelled after 14 minutes. An alkaline furnish similar to that used in Example 1 was used to measure the freeness of several combinations of the polysilicate microgel and 20 lb/t BMB S-190 cationic starch. Results are recorded in Table 5.

TABLE 5

| | DRAINAGE MEASUREMENTS | |
|---|---|---|
| | Freeness, ml | |
| lb/t $SiO_2$ loading | Colloidal silica | Polysilicate microgel |
| 1 | 415 | 450 |
| 2 | 435 | 495 |
| 4 | 470 | 565 |
| 8 | 545 | 580 |
| 10 | 530 | 570 |

The polysilicate microgel showed a significantly improved performance over the colloidal silica.

EXAMPLE 6

This example illustrates the use of potassium dichromate ($K_2CrO_7$) as an initiator for polysilicate microgel formation.

Potassium dichromate solution (71.6 g of 5 wt% $K_2CrO_7$) was added with good stirring to 25 g of sodium polysilicate solution containing 10 wt% $SiO_2$ and prediluted to 94.4 g. The mixture was set aside to age. It gelled in 3.5 minutes. A second preparation was sampled 2.5 minutes after mixing and diluted to 0.125 wt% $SiO_2$. Drainage tests were again made under similar conditions to those outlined in Example 1 and results are reported in Table 6.

TABLE 6

DRAINAGE MEASUREMENTS

| lb/t $SiO_2$ added | Freeness, ml Colloidal Silica | Polysilicate microgel |
| --- | --- | --- |
| 4 | 485 | 470 |
| 8 | 530 | 540 |
| 10 | 500 | 550 |

The polysilicate microgel showed comparable performance to the colloidal silica.

EXAMPLE 7

This example demonstrates the use of polysilicic acid microgels in combination with cationic guar in acid furnishes at pH 4.5 and pH 6.0.

A 6 wt% solution of polysilicic was first prepared by deionizing a solution of sodium polysilicate containing 6 wt% $SiO_2$. The polysilicate solution was passed through a 1.5 inch diameter glass column filled with about 14 inches of Dowex® 50W-X8[H+] polystyrene sulfonic acid ion-exchange resin. The flow rate of about 30 ml/minute was adjusted so as to maintain the pH of the polysilicic acid effluent at about pH 2.6. After collecting about 300 ml of product, a portion was diluted to contain 1 wt% $SiO_2$ and set aside. The remainder of the product gelled in just over a day.

After standing for 1 week, a portion of the 1 wt% $SiO_2$ solution was further diluted to 0.125 wt% $SiO_2$ for evaluation of drainage performance in two acid furnishes, one at pH 6 and the other at pH 4.5. Surface area of the aged polysilicic acid microgel was determined to be 1076 $m^2/g$ using the titration procedure of G. W. Sears, Anal. Chem. 28, (1956), p. 1981. For the drainage tests, the furnish used was 0.3 wt% consistency, made up of 70 wt% bleached Kraft pulp (70% hardwood, 30% softwood) and 30 wt% Klondyke® clay, adjusted to the appropriate pH. Klondyke® clay is a product of Engelhard Corporation, Edison, N.J. The polysilicic acid microgel was used in conjunction with Jaguar® C13 cationic guar gum obtained from Stein, Hall and Co. Inc., New York, N.Y. All tests were conducted at a guar loading of 4 lb/t and results are recorded in Table 7.

TABLE 7

DRAINAGE MEASUREMENTS

| | Freeness, ml | | | |
| --- | --- | --- | --- | --- |
| | pH 4.5 Furnish | | pH 6.0 Furnish | |
| lb/t $SiO_2$ loading | Colloidal Silica | Polysilicate Microgel | Colloidal Silica | Polysilicate Microgel |
| 0 | 445 | 445 | 475 | 475 |
| 2 | 430 | 440 | 420 | 430 |
| 4 | 430 | 470 | 450 | 470 |
| 8 | 435 | 520 | 475 | 530 |

At a loading of 8 lb/t of $SiO_2$, a significant improvement in drainage for the polysilicic acid microgel/cationic guar combination can be seen versus the BMA-0/cationic guar combination. The improvement occurs in furnishes at both pH 4.5 and pH 6.0.

EXAMPLE 8

This example reports freeness and white water turbidity measurements together with fines retention measurements using a sample of polysilicic acid microgel.

A polysilicic acid microgel stock solution was prepared by batch deionizing 300 g of sodium polysilicate solution containing 4 wt% $SiO_2$ to pH 3 using Dowex® 50W-X8[H+] ion exchange resin. The polysilicic acid was diluted to 1 wt% and set aside to age. Its surface area, as prepared, was determined to be 1187 $m^2/g$ using the titration method of G. W. Sears referenced above. After standing for about 18 hours, the surface area decreased slightly to 1151 $m^2/g$. The microgel was then examined for performance in both Canadian Standard freeness and Britt Jar fines retention tests.

For the tests, a furnish of similar composition to that used in Example 1 was employed. Consistency of the furnish was 0.3 wt% for freeness tests and 0.5 wt% for fines retention tests. In the freeness tests, the turbidity of the drainage white water was also measured as a additional indication of fines retention. All tests were conducted in the presence of 20 lb/t of BMB S-190 cationic starch. Results ar given in Tables 8 and 8A.

TABLE 8

DRAINAGE/TURBIDITY MEASUREMENTS

| | Freeness, ml/ Turbidity, NTA units | |
| --- | --- | --- |
| lb/t $SiO_2$ loading | Colloidal Silica | Polysilicic Acid Microgel |
| 0 | 410/151 | 410/151 |
| 2 | 450/119 | 525/55 |
| 4 | 500/66 | 555/41 |
| 8 | 550/41 | 510/68 |
| 12 | 525/44 | 500/95 |

It can be seen from Table 8 that the polysilicic acid microgel matched the optimum performance of the commercial colloidal silica in both drainage and fines retention as judged by low turbidity values. Additionally, and most desirably from a commercial standpoint, the microgel reached this optimum at a lower loading of 4 lb/t, that is, only one-half of the 8 lb/t loading required by the commercial silica.

TABLE 8A

FINES RETENTION MEASUREMENTS (BRITT JAR)

| | % Fines Retention | |
| --- | --- | --- |
| lb/t $SiO_2$ Loading | Colloidal Silica | Polysilicic Acid Microgel |
| 0 | 28.6 | 28.6 |
| 2 | 42.8 | 49.4 |
| 4 | 45.1 | 57.9 |

TABLE 8A-continued

FINES RETENTION MEASUREMENTS (BRITT JAR)

| lb/t SiO$_2$ Loading | % Fines Retention | |
|---|---|---|
| | Colloidal Silica | Polysilicic Acid Microgel |
| 8 | 57.9 | 51.5 |
| 12 | 51.8 | 44.8 |

It can be seen that the results in Table 8A confirm the results of Table 8; namely, that the optimum value of fines retention using the microgel is reached at a loading of only one-half the loading required by the commercial colloidal silica.

EXAMPLE 9

This example compares fines retention values obtained using two additional polysilicate microgels with retention values obtained using colloidal silica.

The polysilicate microgels used were prepared as in the stannate initiated Microgel 4A of Example 4 and the aluminate initiated microgel of Example 5. The colloidal silica comparison was BMA-0 and the polymer used in all cases was BMB S-190 cationic starch at a loading of 20 lb/t. All tests were conducted using a standard Britt Jar apparatus and the procedure outlined previously. The furnish used was alkaline at pH 8.0 and of a similar make-up to that of Example 1.

TABLE 9

FINES RETENTION VALUES

| lb/t SiO$_2$ loading | % Fines Retention | | |
|---|---|---|---|
| | Colloidal Silica | Polysilicate (stannate) | Polysilicate (aluminate) |
| 0 | 33.6 | 33.6 | 33.6 |
| 2 | 40.6 | 42.3 | 49.7 |
| 4 | 46.7 | 44.2 | 70.7 |
| 8 | 60.9 | 73.0 | 72.7 |
| 12 | 62.5 | 69.4 | 65.9 |

An improved performance of the two polysilicate microgels versus the colloidal silica can be readily see from the above data.

EXAMPLE 10

This example illustrates the improvement obtained from the combined use of a polysilicic acid microgel together with a cationic polyacrylamide. A furnish of 100% groundwood was employed.

A furnish of 0.5 wt% consistency was prepared from 100% stoneground wood (50% hardwood/50% softwood). To this was added 0.66 grams per liter (g/l) of anhydrous sodium sulfate to simulate electrolytes. The pH was 5.7. Canadian Standard Freeness measurements were made on portions of the furnish, first diluted to 0.3 wt% consistency and after the addition of increasing amounts of Hyperfloc ® CP-905H cationic polyacrylamide. This material was obtained from Hychem Inc., Tampa, Fla. It had a molecular weight average of 13 million and was 20–30 wt% cationic. At loadings of 0, 1, 2, 4, and 6 lb/t of the cationic polyacrylamide, freeness values of 390, 420, 430, 430 and 485 ml respectively, were measured.

For comparisons of the performance of a polysilicic acid microgel with colloidal silica, a constant loading of 4 lb/t Hyperfloc ® CP-905H was chosen. The polysilicic acid microgel was a 1 wt% SiO$_2$ solution which had been prepared six days earlier by the de-ionization to pH 3.5 and dilution of a solution of sodium polysilicate containing 4 wt% SiO$_2$. The colloidal silica was BMA-0. The results obtained are given in Table 10. They also include turbidity measurements on the white water drainage from the freeness tests.

TABLE 10

DRAINAGE/TURBIDITY MEASUREMENTS

| lb/t SiO$_2$ Loading | Freeness, ml/Turbidity, NTA units | |
|---|---|---|
| | Colloidal Silica | Polysilicic Acid Microgel |
| 0 | 430/13 | 430/13 |
| 2 | 420/14 | 470/9 |
| 4 | 450/13 | 520/8 |
| 8 | 485/16 | 590/8 |
| 12 | 475/16 | 565/8 |

An improved performance in both freeness and fines retention (reduced white water turbidity) can be seen for the polysilicic acid microgel/cationic polyacrylamide combination.

EXAMPLE 11

This example illustrates the use of several organic compounds in polysilicate microgel formation.

Microgel 11A (Gamma-Butyrolactone as initiator)

Six ml (6.72 g) of gamma-butyrolactone was added to 300 g sodium polysilicate containing 4 wt% SiO$_2$ was added under stirring. The mixture was set aside and found to form a solid gel in about 70 minutes. The pH was then 10.67. This preparation was next repeated and sampled and diluted after 65 minutes standing when it had formed a very loose gel. The loose gel was readily dissolved by stirring to provide a polysilicate microgel containing 0.125 wt% SiO$_2$.

Microgel 11B (Ethyl acetoacetate as initiator)

Ten ml (10.2 g) of ethyl acetoacetate was added to 200 g of sodium polysilicate containing 4 wt% SiO$_2$ was added under stirring. The mixture turned cloudy initially but clarified in less than 1 minute. The pH decreased from 11.22 to 10.61. The mixture was set aside and found to form a solid gel in about 18 minutes. A second similar preparation was allowed to stand for 12 minutes before dilution to 0.125 wt% SiO$_2$ to provide a polysilicate microgel for evaluation.

Microgel 11C (Succinic anhydride as initiator)

Succinic anhydride (2.5 g) was added to 200 g of a stirred sodium polysilicate solution containing 4 wt% SiO$_2$. The anhydride dissolved after about 5 minutes stirring and the pH decreased to 10.22. On further standing, the mixture formed a solid gel in about 75 minutes. A second preparation was diluted to 0.125 wt% SiO$_2$ after 45 minutes standing to provide a polysilicate microgel solution.

The solutions of Microgels 11A, 11B and 11C were evaluated for freeness and retention performance as measured by white water turbidity in an alkaline furnish similar to that described in Example 1. All evaluations were conducted in the presence of 20 lb/t of BMB S-190 cationic starch. The reference sample for purposes of comparison with a commercial product was the colloidal silica, BMA-0, identified earlier.

TABLE 11

ORGANIC INITIATED MICROGELS

| | Freeness, ml/ Turbidity, NTA units | | | |
|---|---|---|---|---|
| lb/t SiO$_2$ Loading | Colloidal Silica | Microgel 11A | Microgel 11B | Microgel 11C |
| 0 | 400/163 | 400/163 | 400/163 | 400/163 |
| 2 | 470/108 | 420/101 | 430/101 | 460/90 |
| 4 | 525/62 | 490/53 | 500/67 | 550/34 |
| 8 | 545/40 | 560/34 | 560/40 | 585/39 |
| 12 | 520/50 | 570/40 | 550/44 | 570/46 |

It may be seen from the results in Table 11 that the polysilicate microgels gave generally improved optimum results to the colloidal silica as evidenced by higher freeness values (improved drainage) and lower turbidity values of the drained white water (improved retention of fines).

EXAMPLE 12

This example reports the surface areas of several of the polysilicate microgels illustrated in foregoing examples.

Several of the polysilicate microgels described in the foregoing examples were re-prepared and determinations of their surface area made using a modification of the Sears titration method referenced earlier. After preparation, each polysilicate microgel was diluted to a concentration equivalent to about 0.75 wt% of SiO$_2$. A 200 g portion was next batch de-ionized at room temperature to pH 3.5, the excess of resin filtered off and 150 g of filtrate titrated for surface area following the Sears procedure. In the case of polysilicate microgels formed using initiators such as borates and chromates which themselves generate acids on de-ionization to pH 3.5, it was necessary to correct for the acid generated from the initiator by running a blank determination on the initiator alone.

Table 12 lists the surface areas obtained.

TABLE 12

SURFACE AREAS OF POLYSILICATE MICROGELS

| Initiator Used | Example Number | Microgel Surface area, m$^2$/g |
|---|---|---|
| Borate | 3 | 998 |
| Stannate | 4 | 1480 |
| Aluminate | 5 | 1125 |
| Dichromate | 6 | 1065 |

I claim:

1. A method for improving retention and drainage in a papermaking process of the type wherein aqueous paper furnish containing pulp is formed and dried which comprises adding to the pulp a water soluble polysilicate microgel formed by partial gelation of an alkali metal silicate in combination with at least about 0.001 wt percent, based on the dry weight of the paper furnish, of a water soluble cationic polymer.

2. The method of claim 1 in which the water soluble cationic polymer is selected from the group consisting of cationic starch, cationic guar and cationic polyacrylimide.

3. The method of claim 1 or claim 2 in which the water soluble polysilicate microgel is added to the pulp in an amount of from about 0.001 to 1.0 wt% based on the dry weight of the paper furnish.

4. The method of claim 3 in which the polysilicate microgel comprises aggregates of particles in which each particle has a surface area of at least about 1000 meters$^2$/gram.

5. In a papermaking process of the type in which an aqueous paper furnish containing pulp is formed and dried, the improvement comprising sequentially adding to the pulp a water soluble polysilicate microgel in an amount of from about 0.001 to 1.0 wt%, based on the dry weight of the paper furnish, and at least about 0.001 wt%, based on the dry weight of the paper furnish, of a water soluble cationic polymer to improve drainage and fines retention.

6. The improvement of claim 5 in which the polysilicate microgel is formed by partial gelation of an alkali metal silicate and comprises aggregates of particles in which each particle has a surface area of at least about 1000 meters$^2$/gram.

7. The improvement of claim 5 or claim 6 in which the water soluble cationic polymer is selected from the group consisting of cationic starch, cationic guar and cationic polyacrylimide.

* * * * *

UNITED STATES PATENT AND TRADEMARK OFFICE
CERTIFICATE OF CORRECTION

PATENT NO. : 4,954,220

DATED : September 4, 1990

INVENTOR(S) : John Derek Rushmere

It is certified that error appears in the above-identified patent and that said Letters Patent is hereby corrected as shown below:

In Col. 1, Line 6, after the Title, insert:

"CROSS-REFERENCE TO RELATED APPLICATION,

This application is a continuation-in-part of application Serial No. 07/245,184 filed September 16, 1988 (now abandoned)."

Signed and Sealed this

Twenty-ninth Day of November, 1994

*Attest:*

BRUCE LEHMAN

*Attesting Officer*     *Commissioner of Patents and Trademarks*